United States Patent
Utsuno

(10) Patent No.: US 8,220,421 B2
(45) Date of Patent: Jul. 17, 2012

(54) COOLING SYSTEM FOR INTERNAL COMBUSTION ENGINE

(75) Inventor: Kazunori Utsuno, Nagoya (JP)

(73) Assignee: Aichi Machine Industry Co., Ltd., Nagoya-shi (JP)

( * ) Notice: Subject to any disclaimer, the term of this patent is extended or adjusted under 35 U.S.C. 154(b) by 409 days.

(21) Appl. No.: 12/542,322

(22) Filed: Aug. 17, 2009

(65) Prior Publication Data

US 2010/0186684 A1    Jul. 29, 2010

(30) Foreign Application Priority Data

Jan. 28, 2009   (JP) .................... 2009-017242

(51) Int. Cl.
    *F01P 7/14*    (2006.01)
(52) U.S. Cl. .............. 123/41.08; 123/41.1; 236/34.5
(58) Field of Classification Search .............. 123/41.08, 123/41.09, 41.1, 41.72, 142.5 R, 568.12, 123/568.18; 236/34.5, 101 C
    See application file for complete search history.

(56) References Cited

U.S. PATENT DOCUMENTS

| | | | | |
|---|---|---|---|---|
| 4,748,941 A | * | 6/1988 | Kashiwase | 123/41.1 |
| 5,170,752 A | * | 12/1992 | Binversie et al. | 123/41.08 |
| 5,894,834 A | | 4/1999 | Kim | |
| 5,967,101 A | | 10/1999 | Roth et al. | |
| 6,460,492 B1 | | 10/2002 | Black et al. | |

FOREIGN PATENT DOCUMENTS

| | | |
|---|---|---|
| DE | 19646295 A1 | 5/1998 |
| GB | 2444271 A | 6/2008 |
| JP | S59-139516 U | 9/1984 |

OTHER PUBLICATIONS

Official Communication dated Mar. 2, 2011 for the corresponding European Application No. 09010667.5.

* cited by examiner

*Primary Examiner* — Noah Kamen
*Assistant Examiner* — Hung Q Nguyen
(74) *Attorney, Agent, or Firm* — Global IP Counselors, LLP

(57) ABSTRACT

A cooling system for cooling an internal combustion engine includes a first portion, a second portion and a bypass valve. The first portion forms a first fluid chamber through which a cooling medium passes as it flows from the engine to a heater that utilizes heat generated by the internal combustion engine. The second portion forms a second fluid chamber through which the cooling medium passes as it flows from the heater to the engine. The second fluid chamber is arranged adjacent to the first fluid chamber. The bypass valve is arranged inside the first fluid chamber and the second fluid chamber to form a bypass flow passage connecting the first fluid chamber and the second fluid chamber. The bypass valve is configured and arranged to automatically close the bypass flow passage when a temperature of the cooling medium is equal to or higher than a first prescribed temperature.

6 Claims, 5 Drawing Sheets

COOLING SYSTEM FOR INTERNAL COMBUSTION ENGINE

CROSS-REFERENCE TO RELATED APPLICATIONS

This application claims priority to Japanese Patent Application No. 2009-017242, filed on Jan. 28, 2009. The entire disclosure of Japanese Patent Application No. 2009-017242 is hereby incorporated herein by reference.

BACKGROUND OF THE INVENTION

1. Field of the Invention

The present invention relates to a cooling system for an internal combustion engine.

2. Background Information

The idea of a cooling system for cooling an internal combustion engine (engine) has been known for some time. Japanese Unexamined Utility Model Application Publication No. 59-139516 discloses a cooling system that includes, for example, a heater, a radiator, a fan, and a cooling medium circulating apparatus. The heater is a heat exchanger configured to utilize heat generated by the engine. The radiator is a heat exchanger configured to discharge heat generated by the engine to an outside of the cooling system.

The cooling medium circulating apparatus is a device for circulating the cooling medium (e.g., a coolant comprising a mixture of antifreeze and water) and is connected to the engine, the heater, and the radiator. More specifically, the cooling medium circulating apparatus has a heater flow passage, a radiator flow passage, a bypass flow passage, a water pump, a thermostatic valve, a bypass valve, and a heater valve.

The heater flow passage is a flow passage through which coolant flows to and from the heater. The radiator flow passage is a flow passage through which coolant flows to and from the radiator. The bypass flow passage is a flow passage through which coolant is returned to the engine without passing through the heater or the radiator.

The water pump is a mechanical pump driven with power generated by the engine and is arranged to pump coolant to a water jacket of the engine. An inlet of the water pump is connected to the heater flow passage and the radiator flow passage.

The thermostatic valve is a valve contrived such that an open/close state thereof changes automatically in accordance with a temperature and is arranged in a connecting portion between the heater flow passage and the radiator flow passage. The heater valve is provided in the heater flow passage in a position between the thermostatic valve and the heater. The bypass valve is provided in the bypass passage.

When a temperature of the coolant is low, the thermostatic valve and heater valve are closed and the bypass valve is opened. In this state, since the coolant is returned to the engine through the bypass flow passage, heat generated by the internal combustion engine is not transmitted to the heater by the coolant. Consequently, the temperatures of the engine and the coolant rise readily and the time required for the engine to warm up can be shortened.

In view of the above, it will be apparent to those skilled in the art from this disclosure that there exists a need for an improved cooling system for an internal combustion engine. This invention addresses this need in the art as well as other needs, which will become apparent to those skilled in the art from this disclosure.

SUMMARY OF THE INVENTION

With the cooling system presented in the above mentioned publication, it is necessary to provide a thermostatic valve, a bypass valve, and a heater valve, as well as a large number of parts required for connecting these components. Consequently, a manufacturing cost is high.

An object of the present invention is to provide a cooling system for an internal combustion engine that enables a manufacturing cost to be reduced.

A cooling system for cooling an internal combustion engine according to one aspect of the present invention includes a first portion, a second portion and a bypass valve. The first portion forms a first fluid chamber through which a cooling medium passes as the cooling medium flows from the internal combustion engine to a heater that utilizes heat generated by the internal combustion engine. The second portion forms a second fluid chamber through which the cooling medium passes as the cooling medium flows from the heater to the internal combustion engine, the second fluid chamber being arranged adjacent to the first fluid chamber. The bypass valve is arranged inside the first fluid chamber and the second fluid chamber to form a bypass flow passage connecting the first fluid chamber and the second fluid chamber. The bypass valve is configured and arranged to automatically close the bypass flow passage when a temperature of the cooling medium is equal to or higher than a first prescribed temperature.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
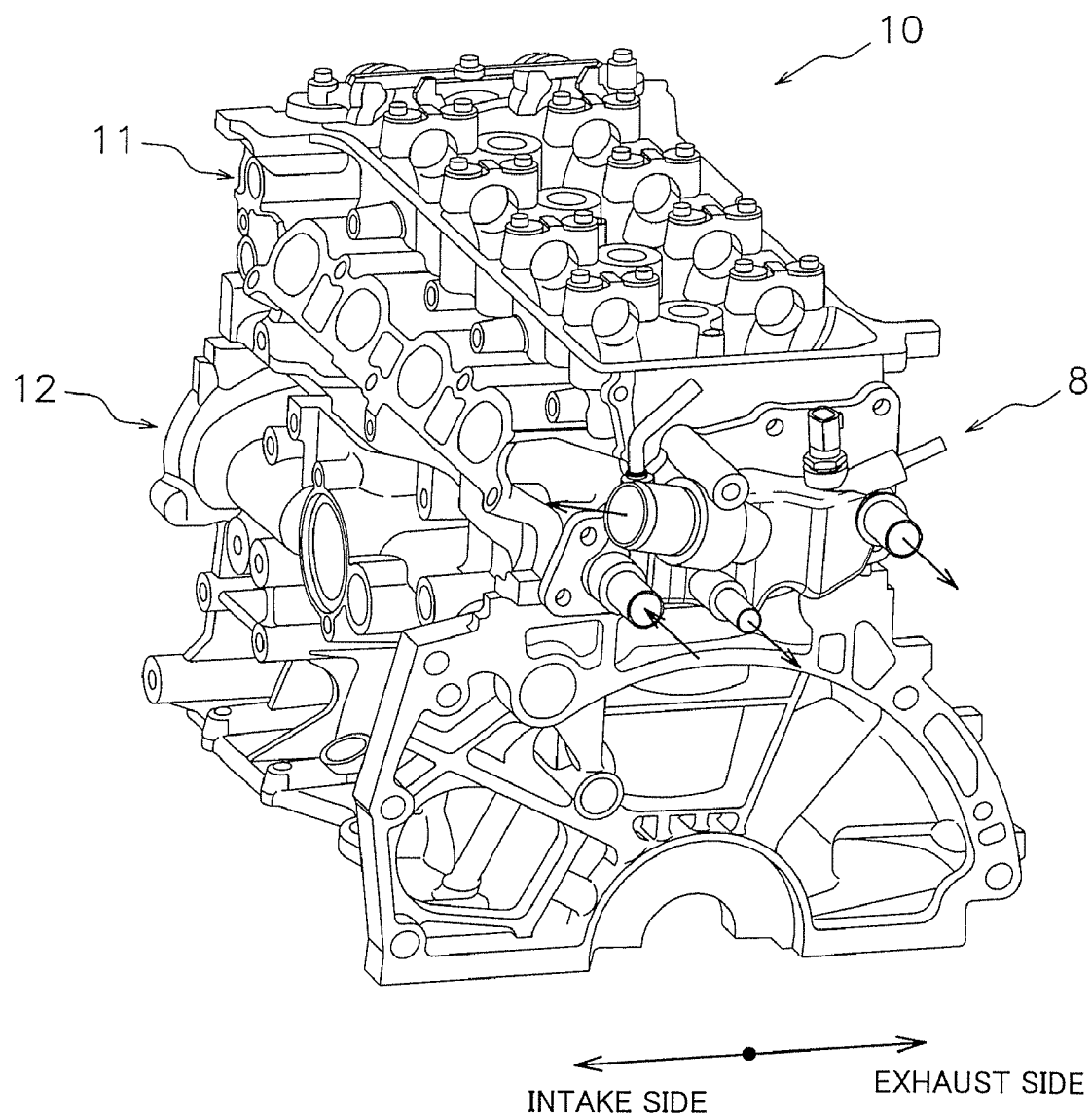
FIG. 1 is a schematic perspective view of an internal combustion engine according to one embodiment of the present invention.

Referring initially to FIG. 1, an internal combustion engine 10 provided with a cooling system 1 is illustrated in accordance with an embodiment of the present invention.

Constituent Features of Cooling System

Figure 2:
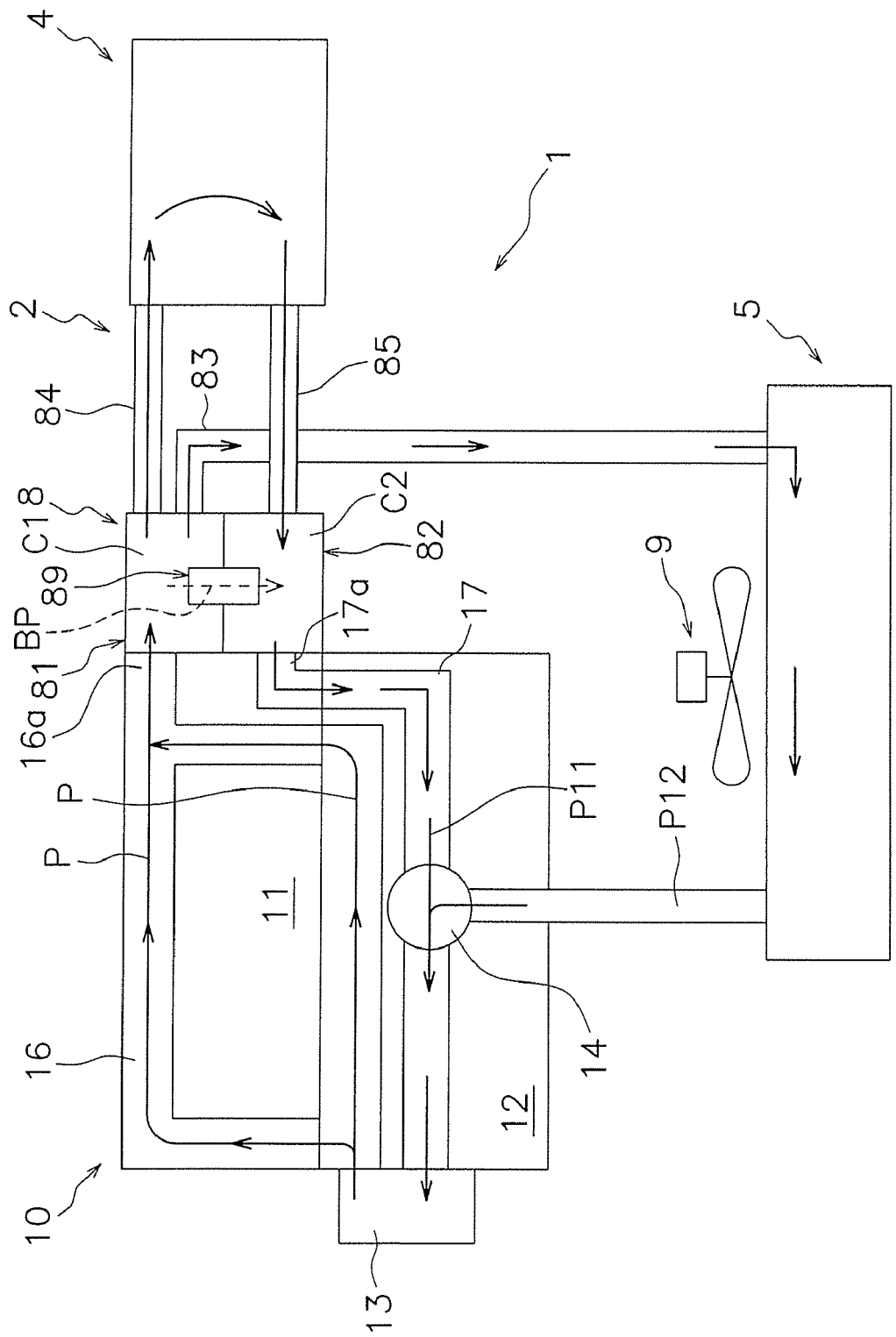
FIG. 2 is a schematic view of a cooling system according to the embodiment of the present invention.

Constituent features of a cooling system 1 for cooling an internal combustion engine 10 will now be explained with reference to FIGS. 1 to 4. FIG. 1 is a schematic perspective view of the internal combustion engine 10. FIG. 1 shows only a cylinder head 11 and a cylinder block 12 of the engine 10. FIG. 2 is a schematic view showing constituent features of the cooling system 1. In FIG. 1, the right side is an intake side and the left side is an exhaust side.

As shown in FIG. 1, the engine 10 comprises chiefly the cylinder block 12 and the cylinder head 11. The cylinder block 12 is provided with a plurality of cylinders (not shown). The cooling system 1 is provided because heat is generated due to combustion in the cylinders.

As shown in FIG. 2, the cooling system 1 comprises a heater 4, a radiator 5, a fan 9, and a coolant circulating apparatus 2. The heater 4 is a heat exchanger for effectively utilizing heat generated by the engine 10. The radiator 5 is a heat exchanger for discharging heat generated by the engine 10 to an outside of the cooling system 1 and is air-cooled by the fan 9. The fan 9 is driven by the engine 10.

As shown in FIG. 2, a water jacket 16 contrived for a coolant (example of a cooling medium) to flow through is provided on the cylinder block 12 and the cylinder head 11. The water jacket 16 is a space arranged around a periphery of the cylinders (not shown) serves to form a coolant flow passage P through which the coolant flows. In order to circulate the coolant, the coolant circulating apparatus 2 connects to the engine 10, the heater 4, and the radiator 5.

Constituent Features of Coolant Circulating Apparatus

Figure 3:
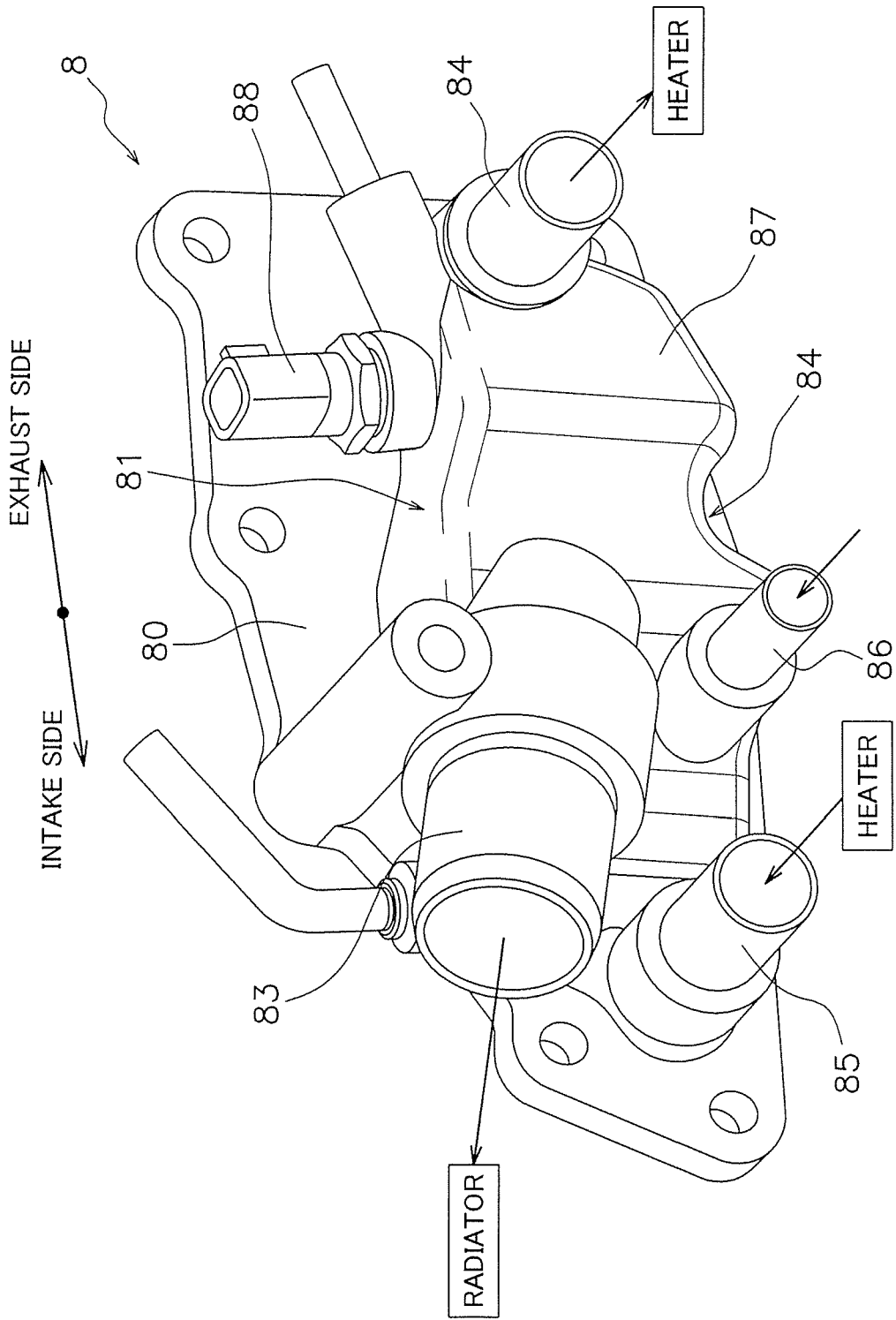
FIG. 3 is a perspective view of an outlet cover according to the embodiment of the present invention.
Figure 4:
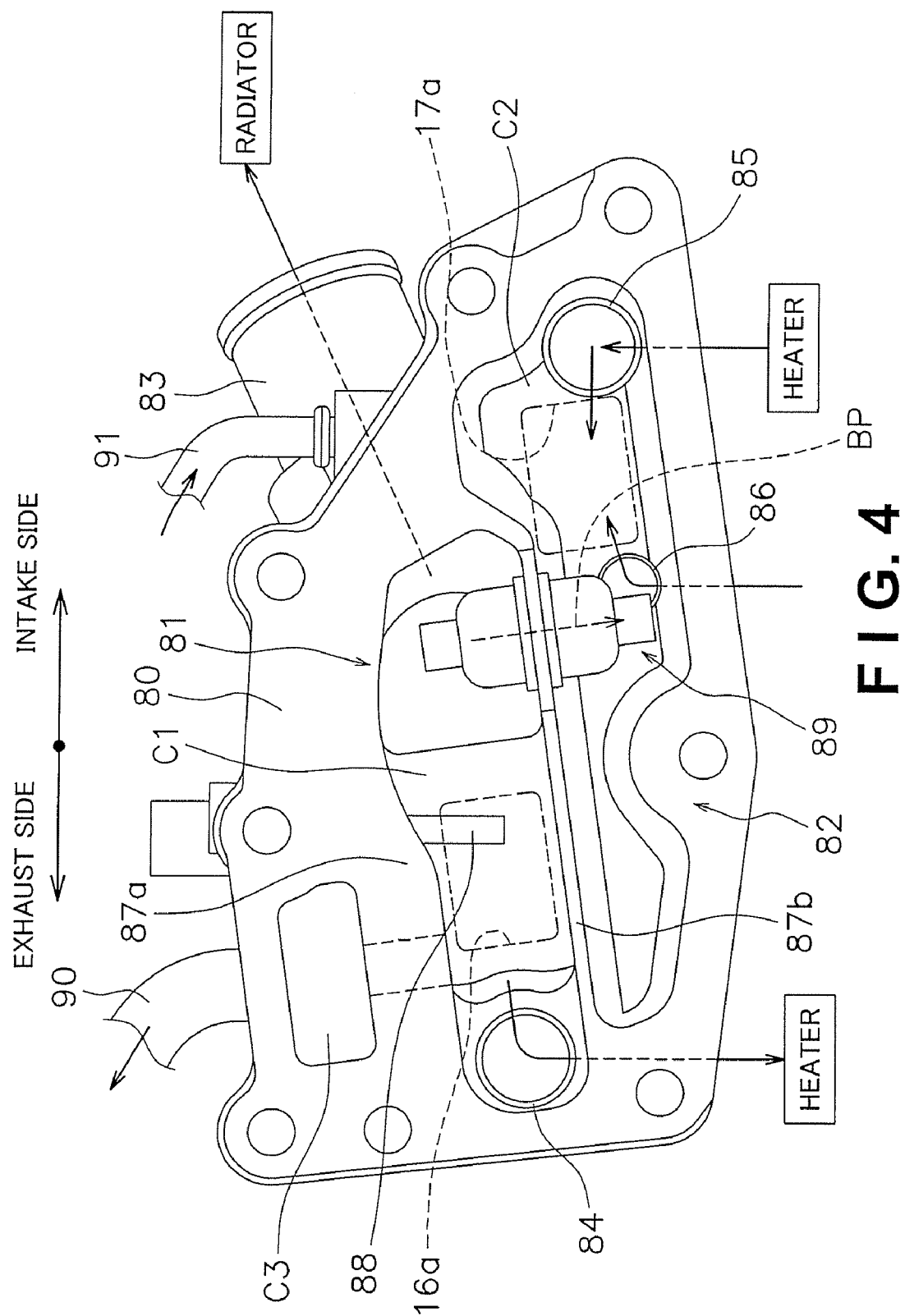
FIG. 4 is a plan view of the outlet cover according to the embodiment of the present invention.

The coolant circulating apparatus 2 will now be explained in detail with reference to FIGS. 1 to 4. FIG. 3 is a perspective view showing an outward side of an outlet cover 8 (outlet cover member). FIG. 4 is a plan view showing an inward side of the outlet cover 8.

The coolant circulating apparatus 2 is an apparatus for circulating coolant and, as shown in FIG. 2, has a water pump 13, a first thermostatic valve 14, an outlet cover 8, and a second thermostatic valve 89 (example of a bypass valve).

(1) Water Pump

The water pump 13 is a pump that is driven with power generated by the engine 10 and connected to an inlet of the water jacket 16. The water pump 13 pumps coolant through the coolant flow passage P formed by the water jacket 16.

(2) First Thermostatic Valve

The first thermostatic valve 14 is configured to open and close automatically in response to a temperature of the coolant and has, as shown in FIG. 2, a first flow passage P11 and a second flow passage P12. In this embodiment, the first thermostatic valve 14 is contrived such that an open/close state thereof changes automatically at a prescribed temperature (e.g., 80° C.). The first flow passage P11 forms a portion of a flow passage leading from a second fluid chamber C2 (explained later) to the water pump 13 and is always open. The second flow passage P12 forms a portion of a flow passage leading from the radiator 5 to the water pump 13 and is switched between an open state and a closed state in accordance with a temperature of the coolant. When the temperature of the coolant is 80° C. or higher, the first thermostatic valve 14 is opened such that coolant can flow from the second flow passage P12 to the first flow passage P11. When the temperature of the coolant is below 80° C., the first thermostatic valve 14 is closed such that coolant cannot flow from the second flow passage P12 to the first flow passage P11.

For example, when the first thermostatic valve 14 is closed, coolant is not discharged from the radiator 5 because the flow path on the discharge side of the radiator 5 is closed. In other words, coolant does not flow into the radiator 5. Meanwhile, when the first thermostatic valve 14 is open, coolant discharged from the radiator 5 passes through the thermostatic valve 14 and into the water pump 13. In this way, the first thermostatic valve 14 enables the flow of coolant to the radiator 5 to be allowed or stopped (switched) automatically depending on a temperature of the coolant.

(3) Outlet Cover

As shown in FIG. 2, the outlet cover 8 is a part that serves to distribute coolant flowing from the coolant flow passage P to the heater 4 and the radiator 5 or to the water pump 13 without passing through the heater 4 or the radiator 5. As shown in FIG. 1, the outlet cover 8 is fixed to a side portion of the cylinder head 11. The outlet cover 8 is arranged covering an outlet of the coolant flow passage P, which is an outlet of the water jacket 16.

As shown in FIG. 3 and FIG. 4, the outlet cover 8 has a flange 80, a fluid chamber forming section 87, a first connector 83, a second connector 84, a third connector 85, and a fourth connector 86. The flange 80 is a portion that is fastened to the engine 10. The fluid chamber forming section 87 protrudes from the flange 80 and has a body section 87a and a partitioning wall 87b formed as a one-piece integral unit with the body section 87a.

As shown in FIG. 4, the body section 87a forms a space that basically constitutes the first fluid chamber C1 and the second fluid chamber C2. As shown in FIG. 4, the partitioning wall 87b is a plate-like portion arranged inside the body section 87a and serves to partition the space therein so as to form the first fluid chamber C1 and the second fluid chamber C2. In other words, the first fluid chamber C1 and the second fluid chamber C2 are formed by the body section 87a, the partitioning plate 87b, and the engine 10.

A portion forming the first fluid chamber C1 is called a first portion 81, and a portion forming the second fluid chamber C2 is called a second portion 82. The first portion 81 and the second portion 82 can be said to share the partitioning wall 87b.

The first fluid chamber C1 is a space through which coolant passes as it flows from the engine 10 to the heater 4 and is arranged to communicate with an outlet 16a of the water jacket 16. The first fluid chamber C1 is connected to a coolant inlet of the radiator 5 through the first connector 83 and to a coolant inlet of the heater 4 through the second connector 84. As a result, coolant flowing into the first fluid chamber C1 flows into the heater 4 and the radiator 5.

As shown in FIG. 4, the outlet 16a of the water jacket 16 is arranged generally near a center portion of the first fluid chamber C1. A coolant temperature sensor 88 is provided on the outlet cover 8 to detect a temperature of the coolant. As shown in FIG. 4, a tip end of the coolant temperature sensor 88 is arranged near an edge of the outlet 16a of the water jacket 16a.

A connecting portion between the first portion 81 and the second connector 84 is arranged near an end portion of an exhaust side (left side in FIG. 4) of the first fluid chamber C1. A connecting portion between the first portion 81 and the first connector 83 is arranged near an end portion of an intake side (right side in FIG. 4) of the first fluid chamber C1 and near an inlet of the second thermostatic valve 89. As shown in FIG. 4, the outlet 16a is arranged between the first connector 83 and the second connector 84.

The second fluid chamber C2 is a space through which coolant passes as it flows from the heater 4 to the engine 10 and is arranged adjacent to the first fluid chamber C1. In this embodiment, the second fluid chamber C2 is arranged below the first fluid chamber C1. The second fluid chamber C2 is connected to a coolant outlet of the heater 4 through the third connector 85 and communicates with an inlet 17a of a suction passage 17 formed in the cylinder head 11. As a result, coolant exiting the heater 4 flows into the second fluid chamber C2, and coolant flowing into the second fluid chamber C2 flows to the suction passage 17 and enters the water pump 13.

A connecting portion between the second portion 82 and the third connector 85 is arranged near an end portion of an intake side of the second fluid chamber C2. The second fluid chamber C2 is connected to a transmission (not shown) or other device through the fourth connector 86. A portion of the coolant pumped out of the water pump 13 is sent as a coolant to the transmission or other device and returns to the second fluid chamber C2 through the fourth connector 86.

As shown in FIG. 4, a third fluid chamber C3 is formed in the outlet cover 8. The third fluid chamber C3 is a space for collecting foam that develops in the coolant and is arranged to communicate with the first fluid chamber C1. Coolant that flows into the third fluid chamber C3 passes through a fifth connector 90, flows through an outer portion of a throttle chamber (not shown) of the engine 10, and returns to the second fluid chamber C2 through a sixth connector 91. As a result, the throttle chamber is warmed by the coolant and malfunctioning of the throttle valve caused by freezing can be prevented.

(4) Second Thermostatic Valve

As shown in FIG. 2, the second thermostatic valve 89 is configured to open and close automatically in accordance with a temperature of the coolant and is arranged inside the first fluid chamber C1 and the second fluid chamber C2. In this embodiment, the second thermostatic valve 89 is contrived such that an open/close state thereof changes automatically at a prescribed temperature (e.g., 80° C., an example of a first prescribed temperature). The second thermostatic valve 89 forms a bypass flow passage BP configured and arranged to connect the first fluid chamber C1 and the second fluid chamber C2. When the temperature of the coolant is 80° C. or higher, the second thermostatic valve 89 automatically closes such that the bypass flow passage BP is blocked.

The second thermostatic valve 89 is mounted to a partitioning plate 87b. The second thermostatic valve 89 is arranged near a connecting portion between the first portion 81 and the first connector 83. In other words, the position in the first fluid chamber C1 where the second thermostatic valve 89 is arranged is very far from the second connector 84.

Additionally, the second thermostatic valve 89 is specifically designed such that a flow resistance (pressure loss) occurring when coolant flows from the first fluid chamber C1 to the second fluid chamber C2 through the second thermostatic valve 89 is smaller than a flow resistance (pressure loss) occurring when coolant flows from the first fluid chamber C1 to the second fluid chamber C2 through the heater 4. Consequently, when the second thermostatic valve 89 is open, the coolant flows to the second fluid chamber C2 more readily than to the heater 4.

When the temperature of the coolant is below 80° C., the second thermostatic valve 89 is open such that the first fluid chamber C1 communicates with the second fluid chamber C2. As a result, a portion of coolant flowing into the first fluid chamber C1 from the engine 10 passes through the second thermostatic valve 89 and into the second fluid chamber C2. In other words, when the temperature of the coolant is low, the coolant does not easily pass through the heater 4 and most of the coolant flows from the first fluid chamber C1 to the second fluid chamber C2.

Meanwhile, when the temperature of the coolant is 80° C. or higher, the state of the second thermostatic valve 89 changes from open state to closed and coolant can no longer flow directly from the first fluid chamber C1 to the second fluid chamber C2. Instead, coolant entering the first fluid chamber C1 flows to either the heater 4 or the radiator 5. Thus, since the outlet cover 8 has a second thermostatic valve 89, when the temperature of the coolant is low, the amount of coolant flowing to the heater 4 can be reduced so that the amount of time required for the engine 10 to warm up can be shortened.

Operation of Cooling System

Operation of the cooling system 1 will now be explained with reference to FIG. 2.

When the engine 10 is started, the water pump 13 starts to circulate coolant. As shown in FIG. 2, the coolant discharged from the water pump 13 passes through the water jacket 16 of the cylinder block 12 and the cylinder head 11 and into the first fluid chamber C1 of the outlet cover 8. Immediately after the engine 10 is started, the first thermostatic valve 14 is closed and the second thermostatic valve 89 is open because the temperatures of the engine 10 and the coolant are low (e.g., same as the ambient temperature), When the first thermostatic valve 14 is closed, the flow of coolant through a line of the radiator 5 stops because the second flow passage P12 of the first thermostatic valve 14 is blocked. Consequently, coolant does not flow from the first fluid chamber C1 to the radiator 5. Meanwhile, when the second thermostatic valve 89 is open, a portion of the coolant flowing into the first fluid chamber C1 passes through the second thermostatic valve 89 and into the second fluid chamber C2 while the remaining coolant flows to the heater 4. The coolant flowing into the heater 4 flows from the heater 4 to the second fluid chamber C2.

Since the second thermostatic valve 89 is specifically designed such that a flow resistance occurring when coolant flows through the second thermostatic valve 89 is smaller than a flow resistance occurring when coolant flows from the first fluid chamber C1 to the second fluid chamber C2 through the heater 4, the coolant flows to the second fluid chamber C2 through the second thermostatic valve 89 more readily than through the heater 4 to the second fluid chamber C2.

Coolant flowing into the second fluid chamber C2 passes through the first thermostatic valve 14 and returns to the water pump 13. The water pump 13 then pumps the coolant to the water jacket 16 again.

Thus, when the temperature of the coolant is low, most of the coolant flows from the first fluid chamber C1 to the second fluid chamber C2 through the second thermostatic valve 89 and then returns to the water pump 13 through the first thermostatic valve 14. In this way, most of the heat generated by the engine 10 can be used to raise the temperature of the engine 10 and the coolant, thereby enabling the time required for the engine 10 to warm up to be shortened.

When the temperature of the coolant reaches a prescribed temperature (80° C.), the state of the first thermostatic valve 14 automatically changes from closed to open and the state of the second thermostatic valve 89 automatically changes from open to closed. Consequently, coolant flowing into the first fluid chamber C1 cannot flow directly to the second fluid chamber C2 and, instead, flows through the heater 4 and into the second fluid chamber C2 or through the radiator 5 before reaching the first thermostatic valve 14. In this way, the heat carried by the coolant is used in the heater 4 or emitted outside the system, thereby preventing the temperature of the coolant from becoming higher than necessary.

Features of Cooling System

Distinctive features of the cooling system described heretofore will now be listed.

(1) With this cooling system 1, since the second thermostatic valve 89 is arranged inside the first fluid chamber C1 and the second fluid chamber C2, it is not necessary to provide piping and other parts on the inlet and outlet sides of the second thermostatic valve 89, and thus, the number of parts can be reduced. In short, it is possible to reduce the manufacturing cost. Therefore, it is possible to provide the cooling system 1 for the internal combustion engine 10 that enables a manufacturing cost to be reduced.

(2) With this cooling system 1, since a flow resistance (pressure loss) occurring when coolant flows from the first fluid chamber C1 to the second fluid chamber C2 through the second thermostatic valve 89 is smaller than a flow resistance (pressure loss) occurring when coolant flows from the first fluid chamber C1 to the second fluid chamber C2 through the heater 4, coolant flows more readily to the second thermostatic valve 89 than to the heater 4 when the second thermostatic valve 89 is open. As a result, when a temperature of the coolant is low, a large amount of coolant does not flow to the heater 4 and instead flows through the second thermostatic valve 89 and returns to the engine 10, thereby enabling the engine warming time to be shortened.

(3) With the cooling system 1, since the second thermostatic valve 89 is provided in the partitioning wall 81a, the bypass flow passage BP can be realized with a simpler structure.

(4) With the cooling system 1, since the second thermostatic valve 89 is a valve equipped with a thermostat and is configured to open and close automatically in accordance with a temperature of the coolant, it is not necessary to provide a sensor separately from the valve and the system configuration can be simplified.

Other Embodiments

The specific components and structure of the present invention are not limited to those described in the previous embodiment. Various changes and modifications can be made without departing from the scope of the invention as defined in the claims.

In the explanations that follow, parts having substantially the same function as in the previously described embodiment will be assigned the same reference numerals and detailed explanations thereof will be omitted.

Figure 5:
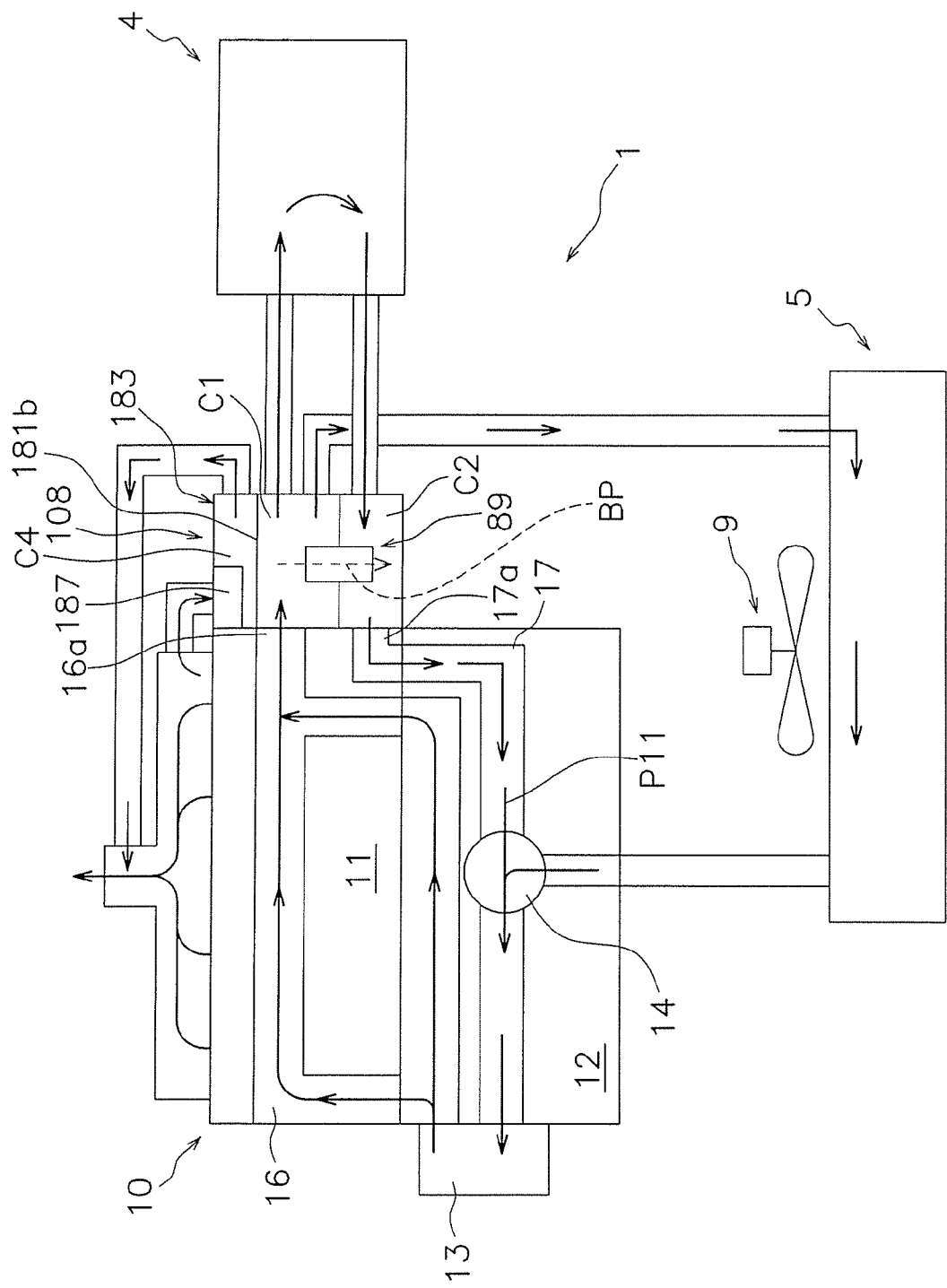
FIG. 5 is a schematic view of a cooling system according to another embodiment of the present invention.

(A) Heat of exhaust gas discharged from the internal combustion engine 10 can be used to shorten the amount of time required for the engine 10 to warm up. More specifically, as shown in FIG. 5, an outlet cover 108 can be provided with a gas flow passage C4 in addition to the first fluid chamber C1 and the second fluid chamber C2. The gas flow passage C4 is arranged adjacent to the first fluid chamber C1 and forms a third portion 183. A second partitioning wall 181b is provided between the first fluid chamber C1 and the gas flow passage C4.

An inlet and an outlet of the gas flow passage C4 are connected to an exhaust manifold 19 of the engine 10. A gas control valve 187 is provided at the inlet of the gas flow passage C4. The gas control valve 187 is configured to change to a closed state automatically, thereby automatically blocking the gas flow passage C4, when a temperature of the coolant is equal to or higher than a prescribed temperature (e.g., 70° C., an example of a second prescribed temperature).

Immediately after the engine 10 is started, the temperatures of the engine 10 and the coolant are low and the gas control valve 187 is opened such that a portion of the exhaust gas discharged from the engine 10 passes through the gas control valve 187 to the gas flow passage C4 and returns to the exhaust manifold 19. Since the exhaust gas temperature is likely to be higher than the coolant temperature, heat possessed by the exhaust gas is transmitted through the second partitioning wall 181b to the coolant flowing in the first fluid chamber C1. As a result, the temperature of the coolant can be raised at a faster rate and the time required for the engine 10 to warm up can be shortened in comparison with the previously described embodiment.

When the engine 10 is substantially finished warming up, i.e., when a temperature of the coolant is, for example, equal to or higher than 70° C., the gas control valve 187 changes to a closed state automatically. As a result, exhaust gas stops flowing to the gas flow passage C4 from the exhaust manifold 19 and the coolant temperature can be prevented from rising more than necessary.

(B) The shape of the outer cover 8 is not limited to the shape presented in the previously described embodiment. Although it is preferable for the second fluid chamber C2 to be arranged below the first fluid chamber C1 from the standpoint of the coolant flowing from the first fluid chamber C1 to the second fluid chamber C2 through the second thermostatic valve 89, if the flow of the coolant is not a concern, then it is acceptable for the second fluid chamber C2 to be arranged above the first fluid chamber C1.

Also, the arrangements of the connecting portions (i.e., the arrangements of the first to fourth connectors 83 to 86) are not limited to those described in the previous embodiment.

(C) The set temperatures of the first thermostatic valve 14, the second thermostatic valve 89, and the gas control valve 18 presented in the previous embodiments are merely examples and it is acceptable to use different temperatures instead.

The cooling system as described above is applicable to the field of internal combustion engines because it can reduce a manufacturing cost of a cooling system.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of an internal combustion engine equipped with the present invention. Accordingly, these terms, as utilized to describe the present invention should be interpreted relative to an internal combustion engine equipped with the present invention. The term "detect" as used herein to describe an operation or function carried out by a component, a section, a device or the like includes a component, a section, a device or the like that does not require physical detection, but rather includes determining, measuring, modeling, predicting or computing or the like to carry out the operation or function.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A cooling system for cooling an internal combustion engine, comprising:
    a first portion forming a first fluid chamber through which a cooling medium passes as the cooling medium flows from the internal combustion engine to a heater that utilizes heat generated by the internal combustion engine;
    a second portion forming a second fluid chamber through which the cooling medium passes as the cooling medium flows from the heater to the internal combustion engine, the second fluid chamber being arranged adjacent to the first fluid chamber; and
    a bypass valve arranged inside the first fluid chamber and the second fluid chamber to form a bypass flow passage connecting the first fluid chamber and the second fluid chamber with the bypass flow passage having a flow resistance smaller than a flow resistance occurring when the cooling medium flows from the first fluid chamber to the second fluid chamber through the heater, the bypass valve being configured and arranged to automatically close the bypass flow passage when a temperature of the cooling medium is equal to or higher than a first prescribed temperature.

2. The cooling system recited in claim 1, wherein the first portion includes a partitioning wall partitioning between the first fluid chamber and the second fluid chamber with the bypass valve being disposed in the partitioning wall.

3. The cooling system recited in claim 1, further comprising
    a third portion forming a gas flow passage disposed closely adjacent to the first fluid chamber, the gas flow passage being configured and arranged to be connected to an exhaust manifold of the internal combustion engine so that an exhaust gas discharged from the internal combustion engine passes through the gas flow passage.

4. The cooling system recited in claim 3, further comprising
    a gas control valve disposed in the gas flow passage to automatically close the gas flow passage when a temperature of the exhaust gas is equal to or higher than a second prescribed temperature.

5. The cooling system recited in claim 1, wherein the bypass valve is a thermostatic valve configured and arranged to open and close automatically in accordance with a temperature of the cooling medium.

6. The cooling system recited in claim 1, wherein the first and second portions are integrally formed in an outlet cover member configured and arranged to be fixedly coupled to the internal combustion engine.

* * * * *